United States Patent

[11] 3,633,347

[72] Inventor John H. Haeberle
 3426 East Central, Wichita, Kans. 67208
[21] Appl. No. 23,883
[22] Filed Mar. 30, 1970
[45] Patented Jan. 11, 1972

[54] MEANS FOR HARVESTING SOYBEAN PLANTS
 6 Claims, 7 Drawing Figs.
[52] U.S. Cl. .................................................. 56/130
[51] Int. Cl. ........................................... A01d 45/22
[50] Field of Search ........................................ 171/54, 53,
 56; 56/128, 129, 130, 2

[56] References Cited
 UNITED STATES PATENTS
 1,449,869  3/1923  Novak ........................... 56/130
 1,429,168  9/1922  Scott ............................. 56/130
 2,358,872  9/1944  Morris ........................... 171/56
 3,260,041  7/1966  McRoberts et al. ............ 56/128
 FOREIGN PATENTS
 1,133,531  11/1958  Great Britain ................ 56/130

Primary Examiner—Antonio F. Guida
Attorney—Duane C. Bowen

ABSTRACT: Catching means extend forwardly from mobile support such as a combine header, aligned with soybean plants growing in rows, and plant-engaging means located adjacent to the catching means insert in the rows forwardly of the forward edge of the catching means and apply force on plants a short distance above the ground in a direction toward the catching means and opposite to the direction of movement of the mobile support, thereby breaking off the plants at about the ground level and causing the tops of the plants to fall toward the catching means for catching, gathering and delivery of broken-off plants by catching means for subsequent threshing operations.

PATENTED JAN 11 1972

INVENTOR.
JOHN H. HAEBERLE

BY Duane C. Bowen

ATTORNEY

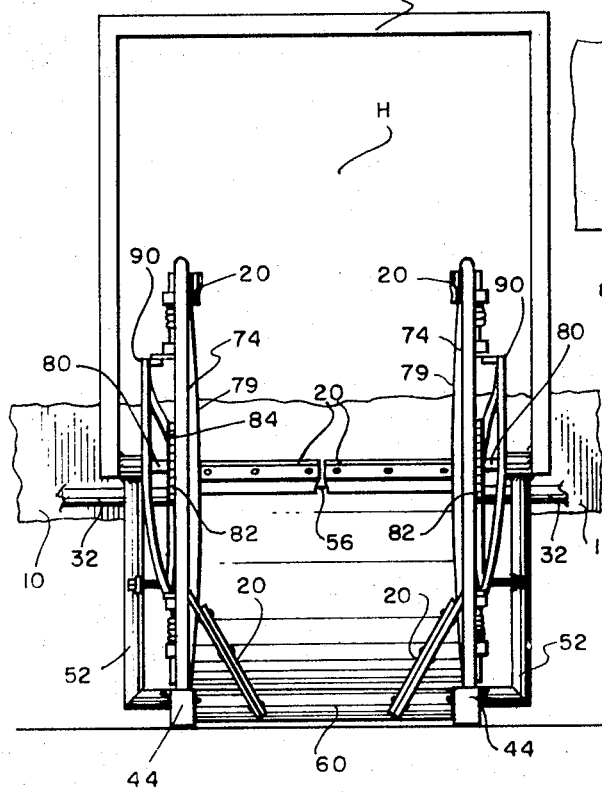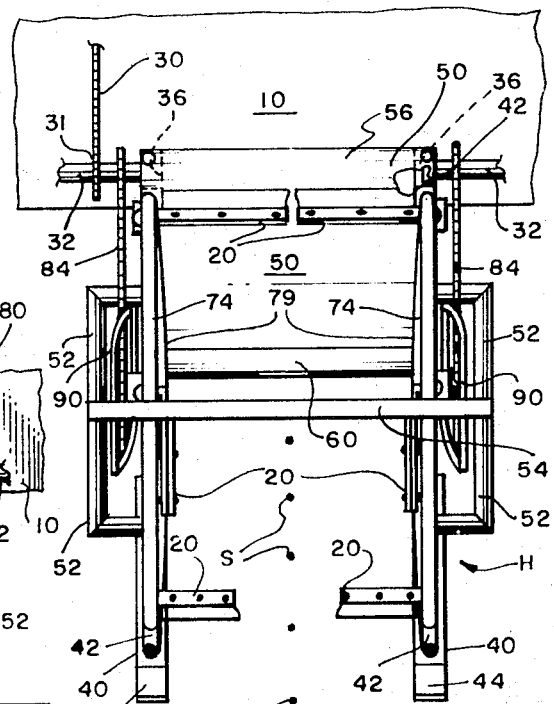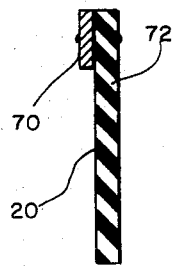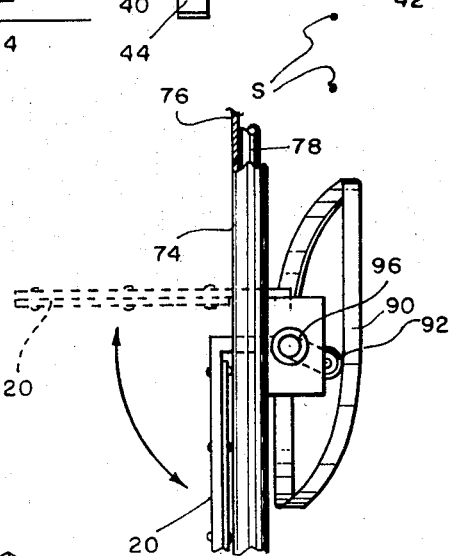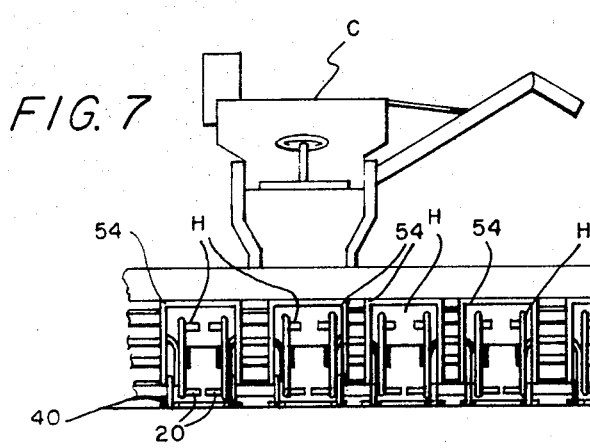

MEANS FOR HARVESTING SOYBEAN PLANTS

BRIEF SUMMARY OF THE INVENTION AND OBJECTIVES

My invention relates to harvesting soybean plants and more particularly to means for and method of harvesting by breaking off the plants at about the ground level when force is applied above the level, as distinguished from a cutting action at a higher level with a combine as is commonly the practice. My apparatus may be attached to the forward edge of a combine header so the combine will provide partial support, motive power, and power for operating parts. Bladelike elements are serially inserted in the soybean rows forwardly of advancing catching means and apply force in a reverse direction to that advancement.

A substantial waste of harvestible soybeans is involved in combining soybeans because the plants are cut normally several inches above the ground whereas bean pods grow substantially to the ground. I have discovered the stalks of soybean plants commonly grown for beans become brittle when matured, ripe, substantially dead plants are in bean-threshing condition i.e., dried to the extent of losing most leaves and having suitable moisture condition for threshing) and are weakest in their lower portions adjacent to the ground level so that the stalks will break off at about ground level when a force is applied a short distance above the ground. When the plants are thus broken off, substantially the complete stalks having bean pods are obtained for threshing. The objectives of my invention include devising the method of and means for harvesting soybean plants by thus breaking off the plants at about ground level. It is a further objective of my invention to devise further operations and apparatus for applying force to the plants, to catch broken-off plants and to gather and deliver the plants for subsequent threshing. An additional objective is to devise means for supporting the harvesting instrumentalities, and for powering the same, and, more particularly, to provide a structure which will utilize a combine as part of the support and for power, and to discharge plants from the catching means into a combine header for threshing operations by the combine. Further objectives of my invention include to devise a structure meeting other operational requirements, and which is practical from viewpoints of cost of equipment, cost of operation, maintainability, ease of use and like considerations.

My invention will be best understood, together with additional objectives and advantages, from the following description, read with reference to the drawings, in which:

FIGS. 3 and 4 are, respectively, front and top views of the apparatus viewed in FIG. 2.

FIG. 5 is an enlarged sectional view of a bladelike element used in the apparatus.

FIG. 6 is a fragmentary view of portions of the apparatus including cam and cam follower and showing a bladelike element moved between a first full-line position and a second dash-line position responsive to the cam action.

FIG. 7 is a fragmentary front view of a series of harvesting units mounted side by side on a combine header.

Figure 1:
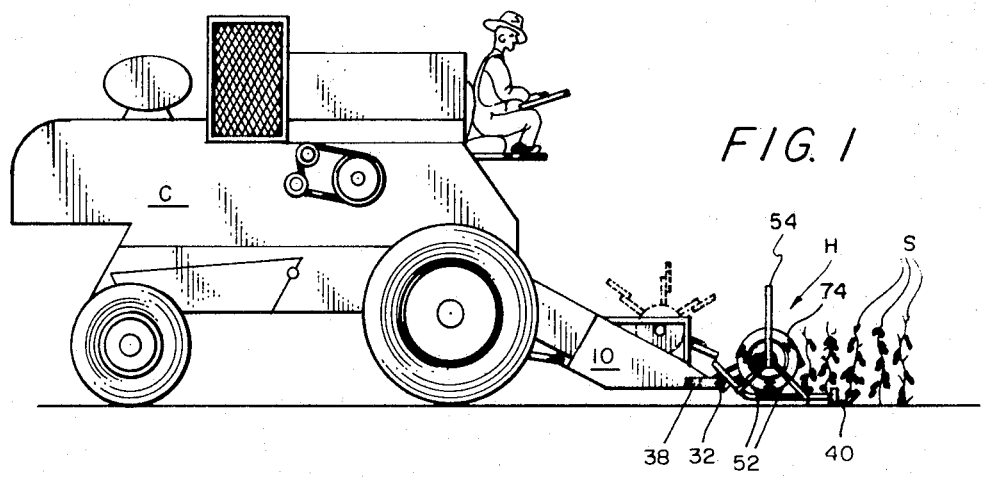
FIG. 1 is a side view of a specific embodiment of my soybean-harvesting means as used in conjunction with a combine.
Figure 2:
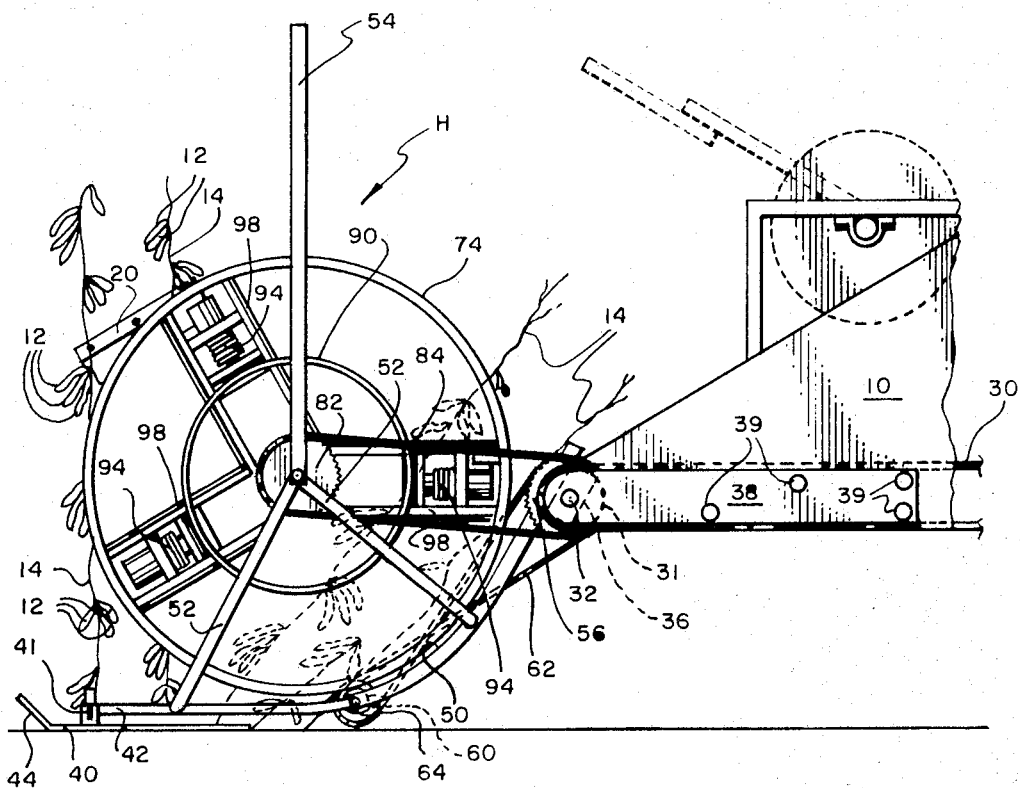
FIG. 2 is an enlarged side view of the apparatus.

Soybean plants S are indicated in FIGS. 1, 2 and 4 as usually grown to obtain threshed beans with the plantings in single rows of spaced plants. Of course, uniform spacing of plants in straight lines is only the general system and there are variations and generous tolerances, but they do not affect applicability of my harvesting system. In fact, my harvesting apparatus would permit of planting variations, should they occur for some reason, such as paired closely spaced rows, more uneven plant spacing, etc. With the common single-row planting shown, it is intended to have a harvesting unit H for each row of soybean plants S as indicated in FIGS. 1, 2 and 4. In FIG. 7, there would be as many rows as units H. The spacing of rows varies between farms, between areas of the country, etc., and the units H will be spaced according to row spacing. In the preferred embodiment, units H are secured side by side along the front edge of header 10 of combine C.

Most soybeans are grown in the United States for beans which are separated by a threshing operation, as distinguished chiefly from a minor part of soybeans plants that are cut green for fodder. It is the former threshing crop I am concerned with, which crop is harvested after the soybean plants are ripe, mature, and at least partly dry and dead, and after substantially all leaves are lost, leaving plants S as viewed particularly in FIG. 2 with bean pods 12 hanging from the main stalk 14, or from branches of the stalk, substantially to ground level. As before indicated, I have appreciated the fact that substantial amounts of soybeans are left in the field when they are commonly harvested by combines cutting the stalks several inches above the ground. It will be understood to be impractical with existing equipment to cut plants substantially at ground level. I have discovered it is possible to detach substantially the entire plant from the ground, at about ground level, by utilizing the normal tendency of the dry plant to break off at about ground level if force is applied thereabove. The exact point of applying force is not critical but a level of about 2 to 4 inches to the general ground plane will be most suitable. It should be understood that depending on the land, the method of tilling, etc., that greater or lesser variations in ground level will occur. If a plant were growing in a narrow ground dip, force might be applied at a level of 6 inches or so up the stalk, although the general height of adjustment (to bottom of bladelike elements 20) is about 2 inches, and the apparatus still operates satisfactorily and even with greater occasional differentials of ground level. However, it should be recognized, as in other harvesting such as combining, that ground levels can become too great, such as with a ditch of certain depths so that the harvesting units would have little if any contact even with plant tops. The point I am making is that the apparatus will operate satisfactorily without contacting each plant at the optimum height for breaking off the same which is about 2–4 inches to the bottom of bladelike elements 20. I do not know why the dry soybean plant stalks are particularly weak at about the ground level, but that is my observation.

Although other means could be used for motive power, for power to operate harvesting instrumentalities, and for partial support, such as a special integrated mobile and power mount, it will be understood to be advantageous to use a combine for this purpose in the many farm operations having combine equipment. Such multiple usages of equipment, including the basic mobile power engine and mount, has been understood generally in farming to be advantageous. I will thus describe my harvesting apparatus H in connection with combine C although those working in the art will understand from my disclosure possibilities of attaching to other existing farm equipment or of fabricating a soybean harvester with its own engine, mobile mount, driving system, etc. The drawings show a reel on combine header 10 in order to orient the viewer to header and combine, but actually in practice the reel would serve no purpose and would not only be disconnected from power but also would be removed from the header as commonly this is an easy operation.

Power to harvesting unit H, I indicate as being provided through chain 30 from any conventional combine power shaft appropriately located (i.e., a power shaft on the combine header 10) to a sheave 31 on the common power shaft 32 (common to the various units H shown in FIG. 7). The rear portions of harvesting units H are supported by the forward portion of header 10 and the support means is integrated with the shaft bearing, i.e., bearing blocks 36 are indicated in FIG. 2 as being connected to harvesting units H and a shaft bearing plate 38 is schematically indicated as being attached to the end of header 10 by bolt means 39. Bolted on plate 38 is a way of indicating a detachable connection to a combine header of common shaft 32, and bearing block 36 indicates a pivotal attachment to shaft 32 (whereby the rear end of harvesting unit H is pivotally supported from header 10), and those skilled in the art will have no difficulty providing that function in connection with the header of a particular brand of combine. It should be noted that connections from harvesting units H to common shaft 32 should adapt to variable spacing of units H, or actually provide that spacing such as by adjustable thrust bearings, etc., and bearing 36 is to be taken as being thus adjustable.

It will be understood that the rear end of units H are adjusted in level by adjusting the level of header 10, that power via chain 30 will be controlled by normal combine power takeoff control, that rate of moving down a row of plants S will be controlled by the operator by combine speed, that following of a row will be a normal operator combine-driving function, and that the combine and harvesting units H advance along a row as per the showing of FIG. 1.

The forward ends of harvesting units H can be supported by various means of fixed or adjustable heights, i.e., wheels, but the structure shown includes a pair of slides 40 having means 41 suitably pivotally securing the slides to the forward ends of a pair of tubes 42 and slides 40 having upturned ends 44 to cam over ground irregularities. Each harvesting unit H will pivot as a whole responsive to ground dips and rises, and the units H independently pivot about common shaft 32. The area between the tubes 42 is open for entry of plants S into the harvesting zone.

The basic frame of each harvesting unit H is made of tubing including tubes 42 that are curved in their rear portions and support a curved catching plate 50 which has its edges turned over tubes 42, and including a pair of radial tubes 52 on each side which secure to tubes 42 at forward and rear locations and which are joined to each other and to the framework on the other side by an inverted U-shaped tube 54 of a height to clear all normal height plants. The tubing frame provides sufficient strength, rigidity and unit to each harvesting unit H so that the unit will accept normal service usage including pivoting as a unit to adjust to local ground conditions.

The purpose of curved catching plate 50 is to receive plants S as they are broken off and to act as a surface over which the plants are pushed by bladelike elements 20 as they are delivered into header 10 for normal combine-type threshing operations by combine C separating beans from pods, stalks, etc., which are discharged back on the field. The rear edge 56 of catching plate 50 is disposed over header 10 to discharge into the same. The forward edge of curved plate 50 is disposed a couple of inches above the ground. Weeds, grass, trash, etc., may tend to hang up and build up on that edge and it is preferably to provide a roller 60 on the edge powered by a chain 62 from a sheave on power shaft 32 to a sheave 62 connected to roller 60. The direction of rotation of roller 60 is clockwise as viewed in FIG. 2, or upward at the forward surface.

The plant-engaging means to apply force to plants S to break off the same include the bladelike elements 20 previously mentioned. Elements 20 closely follow the surface of curved plate 50 for its major portion which is generally circularly curved (as viewed in FIG. 2) about substantially the same center as elements 20 travel whereby the plants are forced by elements 20 rearwardly on plate 50 and into header 10. Elements 20, as shown in section in FIG. 5, include a rigid metal portion 70 and a resilient portion 72 toward plate 50 which can be made of a plastic or rubber, fabric or fiber reinforced, so as to be generally rigid but bending to avoid breakage if a rock or the like should become wedged between an element 20 and plate 50.

Elements 20 travel substantially circular paths (rearwardly on lower arcs) and are supported by a disc-shaped body 74 on each side which is shown as including a disc-shaped metal sheet 76 having its edges wrapped about a circular tube 78. Disc-shaped bodies 74 are supported at each side of harvesting unit H by stub shafts and bearing means 80 (secured to the tubular framework) and has connected thereto a sheave 82 connected to a sheave on common power shaft 32 by chain 84. Disc-shaped bodies in each harvesting unit H have convex inner surfaces facing each other which tend to guide soybean plants into the central portion of the harvesting unit. The convexity (i.e., spherical or conical) will be seen at 79 in FIGS. 3 and 4.

A cam track is fixedly supported adjacent the outer side of each disc 74 and a cam follower 92 is pressed by spring means 94 to bear on track 90. Cam follower 92 is on a crank arm secured to each element 20, and follower 92 and element 20 have pivotal bearing means 96 suitably supported by a framework 98 secured to disc 74 whereby as discs 74 rotate, follower 92 rides on track 90 and pivots said elements 20 inwardly and outwardly.

As shown, elements 20 when retracted extend forwardly (relative to the direction of rotation) in a tangential direction and when extended are parallel to the axis of rotation of discs 74 with resilient portions 72 extending generally radially outward so as to pass adjacent the surface of plate 50 (or to even scrape that surface). Cam track is configured so that elements 20 have assumed a fully extended position in advance of the forward edge of plate 50 about 45° (the forward edge of plate 50 may be about 15° rearward of a vertical radius as viewed in FIG. 2 in side view). If these angles are studied in FIG. 2, it will be seen that elements 20 interpose into the row of plants S the harvesting unit is advancing along substantially ahead of roller 60. In other words, it can be loosely said that elements 20 "knife into the row."

Cam track 90 causes elements 20 to be fully retracted at about the rear edge 56 of plate 50, i.e., about 15° above, so that elements 20 will not interfere with plants falling on plate 50 in the upper forward arcuate advance of elements 20. Considering FIG. 2, the blade associated with framework 98 on the right will be starting to retract, the blade associated with framework 98 at the upper left will be retracted, and the blade associated with framework 98 at the lower left will be extending so as to apply rearward force on plants S and to break off the same and to cause plants S to fall onto catching plate 50. (FIGS. 3 and 4 show the blades in generally the same clocked positions as FIG. 2.) It will be understood that the rearward travel of elements 20 must be much faster than the speed of advance of units H to achieve the result described, i.e., if the speeds were the same the bladelike elements would be stationary relative to the ground. About one revolution per second of discs 74 is a suitable speed in the configuration shown, whereas the speed of advance of units H would be much slower in effective speed. (The relevant speed of elements 20 is essentially the arcuate speed.) Actually speeds of rotation and advance will not only depend on the configuration, sizes, etc., of units H but also on the heaviness of soybean plant growth, so the speeds indicated are only generally illustrative.

The operation of the equipment has been described in the course of the above description and the method of harvesting has been explicitly and implicitly covered. I believe I have discovered or appreciated an aspect of soybean plant growth not before utilized in soybean plant harvest and have outlined a unique method of harvesting and have shown and described a new type of harvesting equipment adapted to that discovery and perception.

Having thus described my invention, I do not wish to be understood as limiting myself to the precise details of construction shown but instead wish to cover those modifications thereof properly within my invention and which will occur to those skilled in the art upon learning my disclosure.

I claim:

1. Means for harvesting matured soybean plants planted in rows comprising:
    a. powered mobile means operable to drive along said rows of soybean plants;
    b. catching means connected to said mobile means and extending forwardly thereof in row alignment and having a forward edge a short distance above ground level;
    c. plant-engaging means connected to said mobile means for power and located adjacent to said catching means and operable to insert in the row forwardly of said forward edge of said catching means and to apply force on plants a short distance above the ground in a direction toward said catching means and opposite to the direction of movement of said mobile means and thereby breaking off said plants at about the ground level and causing the tops of said plants to fall toward said catching means for catching, gathering and delivery of broken-off plants by said catching means for subsequent threshing operations;

d. said powered mobile means being a self-propelled combine;

e. said combine having a header and said catching means extending forwardly from said header;

f. the rear portion of said catching means being pivotally connnected to the forward portion of said header and said catching means having ground-engaging supporting means at its forward portion supporting the forward end of said catching means;

g. said ground-engaging supporting means having slides to slide on the ground and having upturned forward edges to cam over obstacles, and a series of said catching means side by side and pivotally connected to the forward portion of said header by means including a common power shaft for providing power from said combine to the plant-engaging means, the catching means pivoting about the axis of rotation of said common shaft which is horizontally disposed and transverse relative to said direction of movement.

2. Means for harvesting matured soybean plants planted in rows comprising:

a. powered mobile means operable to drive along said rows of soybean plants;

b. catching means connected to said mobile means and extending forwardly thereof in row alignment and having a forward edge a short distance above ground level;

c. plant-engaging means connected to said mobile means for power and located adjacent to said catching means and operable to insert in the row forwardly of said forward edge of said catching means and to apply force on plants a short distance above the ground in a direction toward said catching means and opposite to the direction of movement of said mobile means and thereby breaking off said plants at about the ground level and causing the tops of said plants to fall toward said catching means for catching, gathering and delivery of broken-off plants by said catching means for subsequent threshing operations;

d. said powered mobile means being a self-propelled combine;

e. said combine having a header and said catching means including a curved rigid member extending in a curved manner rearwardly and upwardly from said forward edge to a rear edge disposed to discharge upon said header;

f. said plant-engaging means closely following the surface of said curved member from about the forward edge to about the rear edge of said curved member so as to force broken-off plants rearwardly along said curved member into said header, said plant-engaging means including a series of bladelike members supported adjacent at least one side of said curved member and traveling along said curved member, said plant-engaging means having means supporting said bladelike members retracting the same during travel from a point near said rear edge of said curved member until a point forward of said forward edge of said member.

3. The subject matter of claim 2 in which said plant-engaging means include a series of pairs of said bladelike members supported adjacent opposite sides of said curved member and extending toward and substantially meeting each other in traveling along said curved member.

4. The subject matter of claim 3 in which said bladelike members have resilient members adjacent to said curved member so as to bend and avoid breakage if a rock or the like comes between said bladelike members and said curved member.

5. Means for harvesting matured soybean plants planted in rows comprising:

a. powered mobile means operable to drive along said rows of soybean plants;

b. catching means connected to said mobile means and extending forwardly thereof in row alignment and having a forward edge a short distance above ground level;

c. plant-engaging means connected to said mobile means for power and located adjacent to said catching means and operable to insert in the row forwardly of said forward edge of said catching means and to apply force on plants a short distance above the ground in a direction toward said catching means and opposite to the direction of movement of said mobile means and thereby breaking off said plants at about the ground level and causing the tops of said plants to fall toward said catching means for catching, gathering and delivery of broken-off plants by said catching means for subsequent threshing operations;

d. said plant-engaging means including bladelike members supported to follow a substantially circular path of travel;

e. a series of pairs of bladelike members supported in paired opposites by a pair of disc-shaped members on either side of said catching means which includes a curved plate concentric with said circular path of travel and annular cam means on the outside of each disc-shaped member and cam follower means connected to said bladelike members bearing on said cam means, and said cam means retracting said bladelike members near the rear edge of said plate and extending said bladelike members forward of the forward edge of said plate, each pair of said disc-shaped members having convex surfaces facing each other.

6. Means for harvesting matured soybean plants planted in rows comprising:

a. powered mobile means to drive along said rows of soybean plants;

b. catching means connected to said mobile means and extending forwardly thereof in row alignment and having a forward edge a short distance above ground level;

c. plant-engaging means connected to said mobile means for power and located adjacent to said catching means and operable to insert in the row forwardly of said forward edge of said catching means and to apply force on plants a short distance above the ground in a direction toward said catching means and opposite to the direction of movement of said mobile means and thereby breaking off said plants at about the ground level and causing the tops of said plants to fall toward said catching means for catching, gathering and delivery of broken-off plants by said catching means for subsequent threshing operations;

d. said plant-engaging means including bladelike members supported to follow a substantially circular path of travel, said bladelike members being pivotal in a direction lateral of the direction of movement of said mobile means so as to pivotally extend in insertion into said row forwardly of said catching means and to pivotally retract after passing said catching means;

e. a series of said catching means side by side, a common power shaft located at the rear portion of said catching means, power-connecting means from the power of said mobile means to said common shaft and from said power shaft to said plant-engaging means, and a roller at the forward edge of said catching means connected to said common shaft for power and rolling in a direction to move any materials hanging up at the forward edge of said catching means up and onto said catching means.

* * * * *